United States Patent [19]

Asada et al.

[11] Patent Number: 4,753,048
[45] Date of Patent: Jun. 28, 1988

[54] METHOD OF FOR GRINDING

[75] Inventors: Haruhiko Asada, Sakyo, Japan; Neil Goldfine, Boston, Mass.

[73] Assignee: Massachusetts Institute of Technology, Cambridge, Mass.

[21] Appl. No.: 841,776

[22] Filed: Mar. 20, 1986

[51] Int. Cl.$^4$ ............................................... B24B 1/00
[52] U.S. Cl. ................... 51/281 R; 51/74 R; 51/165.92; 51/165.77
[58] Field of Search ............... 51/165.9, 165.92, 74 R, 51/165 R, 281 R, 165.77

[56] References Cited

U.S. PATENT DOCUMENTS

| | | | |
|---|---|---|---|
| 3,897,660 | 8/1975 | Chijiiwa | 51/165.92 |
| 4,014,142 | 3/1977 | Coes | 51/165.92 |
| 4,575,970 | 3/1986 | Kozai | 51/74 R |
| 4,666,352 | 5/1987 | Nagao | 51/165.92 |

OTHER PUBLICATIONS

R. G. Klein, C. L. Nachtigal, A Theoretical Basis for the Active Control of a Boring Bar Operation, Jun. 1975; Journal of Dynamic Systems, Measurement, and Control.

Lars Gustafsson, Deburring With an Industrial Robot; Society of Manufacturing Engineers, Technical Paper; 1983.

*Primary Examiner*—Harold D. Whitehead
*Attorney, Agent, or Firm*—Hamilton, Brook, Smith & Reynolds

[57] ABSTRACT

There is disclosed a method of and apparatus for improving surface finishing and accuracy in a grinding operation employing a manipulator such as a robot which is coupled to a rotary grinding tool. The method comprises reducing the coupling effects between the tool motion whick is tangential to a workpiece surface and tool motion which is normal to the surface to obtain the optimum performance. The method involves adding compliance to the grinding tool in the tangential direction while maintaining higher stiffness in the normal direction. A robot is disclosed which is made in accordance with the method.

6 Claims, 12 Drawing Sheets

(a) $\theta = 45°$ (b) $\theta = 30°$

METHOD OF FOR GRINDING

FIELD OF THE INVENTION

This invention relates to surface grinding in general and more particularly to compliant manipulators, such as robots, and compliant tool or workpiece mounts and a method of designing them to perform the task of grinding with optimal performance.

BACKGROUND OF THE INVENTION

Most grinding operations, such as weld seam grinding and deburring of large castings, require a large workspace and dexterity with many degrees of freedom. Industrial robots appear to be suitable for these tasks, however, present day robots and manipulators in general have several technical problems that have prevented their successful application in the process of grinding and like processes. As a result, success in automating these tasks has been limited and many grinding applications have remained highly labor intensive in industry despite low productivity, high costs and hazardous working environments.

In grinding applications, the robot manipulator is required to locate and hold the grinding tool in the face of large, vibratory forces which are inherent in the grinding process. Exposure to these unpredictable loads generally results in large deflections at the tip of the robot arm. These deflections degrade the process accuracy and the surface finish. In addition, the large vibratory loads may cause damage to the robot's mechanical structure.

In conventional machine tools, large deflections are eliminated by designing for maximum stiffness in the whole structure. Unfortunately, it is not feasible for robot manipulators to have such high stiffness. For many robot applications including surface grinding the demands for wide workspace, dexterity and mobility with many degrees of freedom introduce kinematic constraints which make robots unavoidably poor in structural stiffness compared to conventional machine tools.

The technical literature is replete with proposed solutions:

As an alternative to high stiffness design, active feedback control has been applied to grinding robots for reducing dynamic deflections. One active control idea was proposed in which actuators are commanded to increase torques in the opposite direction to the deflections. This method reduces dynamic deflections in a certain frequency range. Generally, it is difficult for this control method to perform well over a wide frequency band because it must drive the entire, massive robot arm.

Actively controlling wrist joints or local actuators which are located near the tip of the robot arm is easier and more effective than moving the whole arm, because the inertial forces are smaller. An active isolator has been applied to a chipping robot, where the isolator attached to the arm tip reduced the vibrations seen by the robot. A multi-axis local actuator was developed which compensates for positioning errors at the end point, in a limited range.

For certain applications the stiffness of the robot can be significantly increased by directly contacting the workpiece. Tool support mechanisms have been developed which couple the arm tip to the workpiece surface and bear large vibratory loads. These mechanisms allow the robot to compensate for the tolerancing errors of the workpiece, as well as to increase the stiffness with which the tool is held. A local support mechanism has been applied to a drilling robot for part referenced positioning.

Thus, a number of methods for improving performance and positioning accuracy have been developed, which can be used for a variety of machining applications. A key to successful application, however, is a sound understanding of the machining process, specifically the dynamic interactions between the tool and the robot manipulator. The grinding process, in particular, is a complicated dynamic process in which nonlinear and coupled dynamic behavior has a direct effect on the surface finish and accuracy.

SUMMARY OF THE INVENTION

In accordance with this invention, the relationship between tool vibration and the stiffness with which the tool is held is considered and the optimal tool suspension system is determined. A simple and effective solution to the robot grinding problem results which significantly reduces vibrations without additional actuators or active control.

An optimal suspension system for compliant manipulators, such as robots, was determined through process analysis, simulation, and experimentation. Determination of the optimal suspension design was based upon an evaluation of the coupling between the motion of the grinding wheel in the normal and tangential directions relative to the surface of the workpiece and was formulated in terms of tool suspension stiffness. It was determined that strong coupling caused undesirably large vibrations and generally results in large low frequency waves and chatter marks on the workpiece surface. It was also determined that reducing the coupling between the wheel motions in the normal and tangential directions significantly improved the over all grinding performance. Low coupling was achieved when the stiffness in the direction normal to the desired workpiece surface was much larger than the stiffness in the direction tangent to this surface. Futhermore, with the optimal suspension design, the vibratory behavior during grinding was less erratic, the occurrence of low frequency waves in the workpiece surface were significantly reduced and both the accuracy and surface finish were improved.

It was also determined that optimum results could be achieved by maintaining the direction of maximum stiffness as close as possible to the normal direction while maintaining at least 5 times higher compliance perpendicular to this direction.

The above and other features of the invention will now be more particularly described with reference to the accompanying drawings and pointed out in the claims. It will be understood that the particular method expressing the invention is described by way of illustration only and not as a limitation of the invention. The principles and features of this invention may be employed in varied and numerous embodiments without departing from the scope of the invention, as for example, other machining processes such as rotary filing, high speed milling and internal gringing. Furthermore, the invention is not restricted to two dimensional applications.

BEST MODE OF CARRYING OUT THE INVENTION

Figure 1:
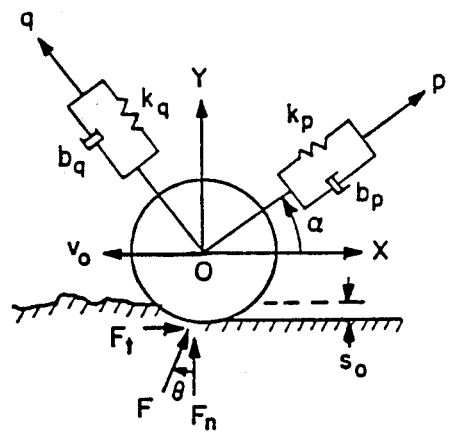
FIG. 1 is a schematic diagram of the grinding process model.

A model of a tool suspension system and the grinding process geometry hereinafter to be explained is shown in FIG. 1. The grinding wheel is a hard 6-inch diameter flat, cylindrical disk with a diameter much larger than the desired depth of cut, $s_o$. The wheel is driven by a 2.5 horsepower motor (not shown) rotating at 120 r.p.m. The depth of the cut, $s_o$, is $20 \times 10^{-3}$ inch and the feed rate is 0.33 inches per second along a 2-inch long, preground mild steel workpiece.

The X axis, in FIG. 1 is directed tangent to the desired workpiece surface, while the Y axis is normal to this surface. The origin O is coincident with the center of the wheel, when the wheel is not deflected from its desired position. As the grinding process proceeds, the O-xy coordinate frame moves at the desired feed rate, $v_o$. The deflections of the wheel are denoted in the formulae hereinafter presented by x(t) and y(t) (not shown in the Figures) and they are defined, with reference to the O-xy reference frame, to be positive when directed away from the workpiece. The variations of the wheel velocity in the $\dot{x}$ and $\dot{y}$ directions from the desired velocities are represented in the formulae x and y, respectively.

Figure 14:
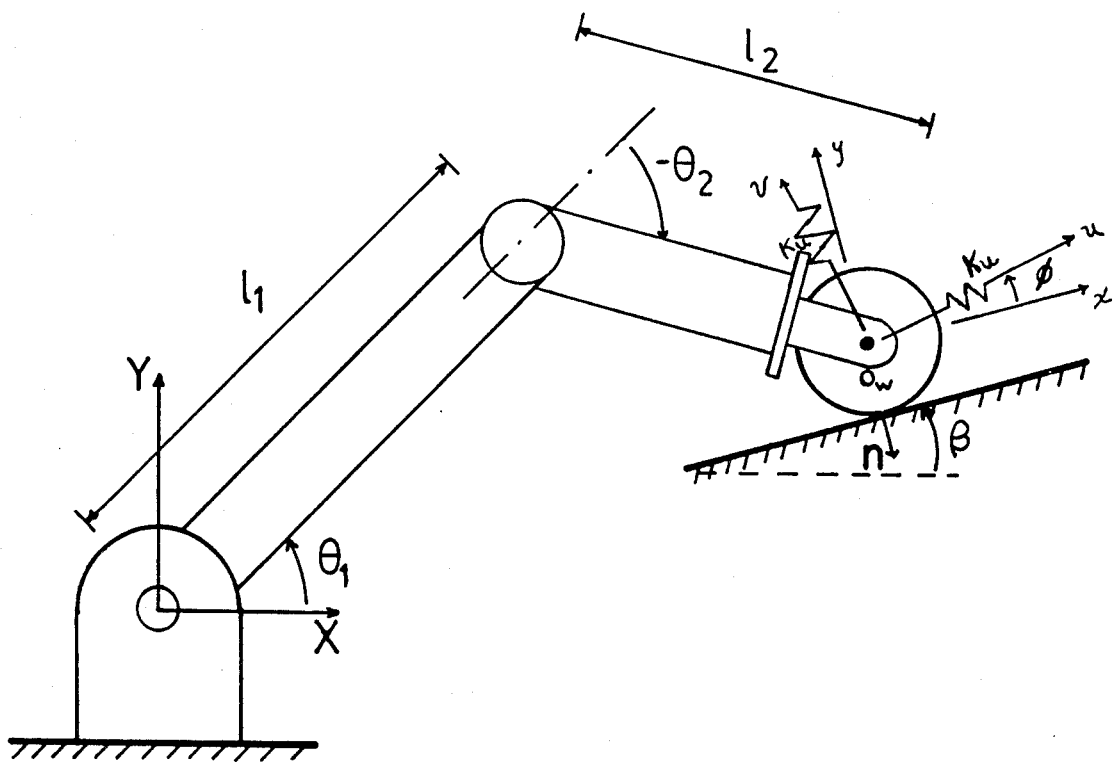
FIG. 14 is a schematic diagram of a two degree-of-freedom grinding robot, with additional end-effector compliance, $1/k_u$ and $1/k_v$.

The grinding wheel and tool are held by a robot manipulator shown in FIG. 14. The tool suspension system shown in FIG. 1 represents the resultant characteristics of a robot arm and an end-effector which couples the grinding tool to the tip of the robot arm.

In general, stiffness matrices of multi-axis mechanical systems have principal axes along which the stiffness is decoupled and can be represented by individual springs. Although the principal axes for damping are generally not coincident with those for stiffness, this will be assumed here for simplicity. Thus, the resultant characteristics can be represented in FIG. 1 by two springs and two dampers $k_p$, $k_q$ and $b_p$, $b_q$, directed along the principal directions p and q accordingly. The p and q directions are orthogonal and the origin of the O-pq coordinate frame is coincident with that of the O-xy frame. The coordinates, p(t) and q(t) (not shown in the Figures), represent the deflections of the grinding wheel from its desired position in the p and q directions. The angle $\alpha$ (FIG. 1) represents the rotation of the O-pq coordinate frame relative to the O-xy frame and will be referred to hereinafter as the "structural stiffness orientation". The spring constants $k_p$, $k_q$ and the structural stiffness orientation $\alpha$ are the primary tool suspension design parameters. These parameters are optimized through their effect upon the grinding performance.

First, the dynamic behavior of the tool suspension system was considered. Let m be the mass of the grinding tool or wheel, then the equations of motion of the tool suspension system in the principal directions are given by $$m\ddot{p} + b_p\dot{p} + k_p p = f_q$$

$$m\ddot{q} + b_q\dot{q} + k_q q = f_q \tag{1}$$

where $f_p$ and $f_q$ are the components of the forces acting on the grinding wheel in the p and q directions respectively.

The reaction force, F, acts upon the wheel during grinding. This reaction force has components in both the normal, y, and tangential, x, directions which are represented by $F_n$ and $F_t$, respectively. The relationship between these components is given by $$F_t = \mu F_n, \quad \mu = \tan \theta \tag{2}$$

where $\mu$ is similar to a friction coefficient. The coefficient $\mu$ is assumed constant for simplification. This is equivalent to assuming a constant force angle, $\theta$. This approximation is only made in the simulations and in no way limits the applications of this invention.

Surface machining processes, such as grinding, are characterized by strong coupling between the normal and tangential directions, which results from the inherent coupling in the reaction force, F. As the wheel moves in the tangential direction, the tangential reaction force, $F_t$, varies. At the same time, the normal reaction force, $F_n$, varies according to equation (2), which affects the wheel motion in the normal direction. This coupling of the wheel motion in the x and y directions was analyzed and the dependence of the vibratory behavior of the grinding wheel on this coupling will be shown.

The components of the reaction force in the principal directions, $f_p$ and $f_q$, are given by $$f_p = F \sin(\alpha + \theta)$$

$$f_q = F \cos(\alpha + \theta) \tag{3}$$

Substituting equation (3) into equation (1), eliminating the scalar force of magnitude F and taking the laplace transform yields the following relation between the behavior along the two principal directions.

$$q(s) = \cot(\alpha + \theta) \frac{ms^2 + b_p s + k_p}{ms^2 + b_q s + k_q} p(s) \quad (4)$$

The final dimensions of the workpiece are directly determined by the behavior of the grinding wheel in the y direction. Deflections in the x direction, on the other hand, have no direct effect on these dimensions. Thus, the behavior of the wheel in the y direction is of primary concern.

The following coordinate transformations are now introduced.

$$x = p \cos \alpha - q \sin \alpha$$

$$y = p \sin \alpha + q \cos \alpha \quad (5)$$

The resulting equation is $$y(s) = G(s)x(s) \quad (6)$$

$$G(s) = \cot\theta \frac{ms^2 + B_t s + K_t}{ms^2 + B_n s + K_n}$$

where $B_t$, $K_t$ and $B_n$, $K_n$ are each a different function of $\alpha$, $k_p$, $b_p$, $k_q$, and $b_q$ and represent the damping and stiffness properties of the suspension system in the normal and tangential directions.

The transfer function G(s) in equation (6) represents the effect of behavior in the x direction on behavior in the y direction. This accounts for the coupling caused by the relation described in equation (2). It has been stated that vibrations are more likely in the tangential direction than the normal direction because of relatively low process stiffness in that direction, and vibrations in the tangential, x, direction cause pulsating normal forces, $F_n$, which cause deflections of the wheel in the normal, y, direction. From this observation, it follows that the coupling must be reduced as much as possible so that the motion in the normal direction, which directly determines the final workpiece dimensions, is not significantly disturbed by large vibrations in the tangential direction.

If only high frequency vibrations are considered the $ms^2$ terms in the transfer function dominate and G(s) reduces to $\cot \theta$. However, it has been shown that high frequency vibrations do not produce waves on the workpiece surface. In other words, for a given feed rate, vibrations above a certain frequency will not directly effect the final workpiece dimensions.

Figure 2A:
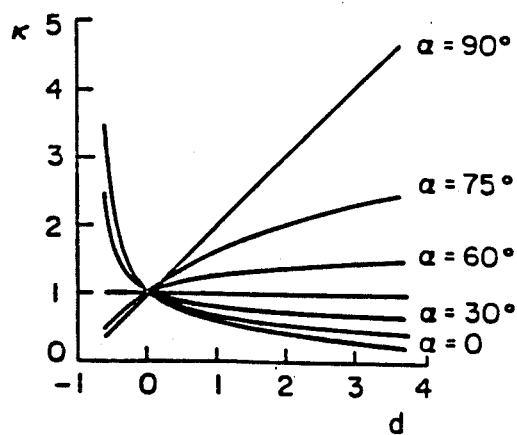
FIGS. 2a and 2b are graphs of the effect of the design parameters $\alpha$ and d on the static coupling parameter.
Figure 2B:
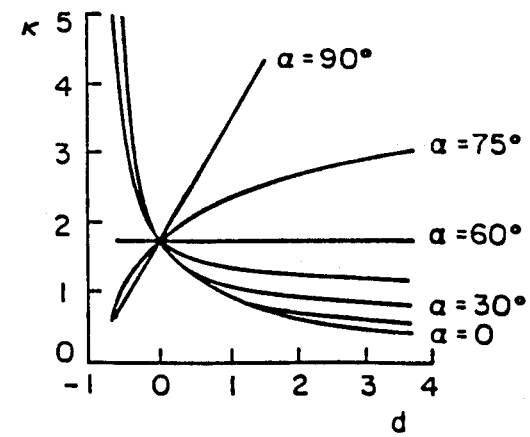

Low frequency vibrations in the normal direction will show up directly as waves on the workpiece surface. For low frequency vibrations the stiffness terms dominate in equation (6). Then the transfer function G(s) reduces to $$G(O) = \frac{K_t}{K_n} \cot\theta \quad (7)$$

$$\kappa = \frac{(d + 2)\cos\theta - d\cos(\theta + 2\alpha)}{(d + 2)\sin\theta + d\sin(\theta + 2\alpha)}$$

where $$d = \frac{k_q - k_p}{k_p} > -1 \quad (8)$$

and κ represents the static coupling between the deflections in the normal and tangential directions. Since the design parameters $\alpha$, $k_q$, and $k_p$ are involved in κ, they effect the coupling for low frequency vibrations. The effect of $\alpha$ and d on κ is shown in FIG. 2 for force angles of 45° and 30°. When the value of κ is near 1, the deflections in the normal and tangential directions are approximately equal and the behaviors in the two directions are strongly coupled. This strong coupling occurs when the p or the q axis is directly aligned with the direction of the grinding force, $\theta$ or when the two spring constants, $k_p$ and $k_q$, are approximately equal. The value of κ is small when the structural stiffness orientation, $\alpha$, is close to O and d is large, or when $\alpha$ is close to 90° and d is small. Both sets of conditions describe the same configuration for the springs, which requires $K_t << K_n$. Also the value of κ is large when $\alpha = O$ and d is small, or when $\alpha = 90°$ and d is large, namely when $K_t >> K_n$. In both cases, $\kappa << 1$ and $\kappa >> 1$, the two directions are weakly coupled. Vibrations during the grinding process become large when the two axes are strongly coupled, κ near 1, and the vibrations are significantly reduced for suspension designs which result in weak coupling, ½ much different from 1.

Grinding Force Analysis

In this section, a macroscopic representation of the grinding force was derived from basic empirical relationships. The goal was not to model the process at a microscopic level but to develop an aggregate representation of the grinding force, which produces behavior similar to that observed in practice and experimentation, when introduced into the original model, shown in FIG. 1.

The grinding force formulation was based on two fundamental empirical relations. The first was presented in equation (2). The second equation is $$Z_w = \Lambda_w F_n$$

$$F_n = CZ, \quad C = 1/\Lambda_w \quad (9)$$

In the first equation above, the variable $Z_w$ represents the volume removed from the workpiece surface per unit time. $\Lambda_w$ is the "Metal Removal Parameter". Since, only the workpiece material removal was considered, $Z_w$ is replaced by Z and the equation was rewritten as in the second equation (9).

In conventional grinding machines, the structure stiffness is high in every direction and it can be assumed that x, y, ẋ, and ẏ are zero. For these conditions, the volume removal rate, Z, is equal to $v_o s_o$. However, when relatively compliant robots are exposed to large unpredictable forces at the tip of the arm, large deflections result and the conventional formulation is not sufficient. In fact, even for conventional grinding, when chatter occurs, the deflections and velocity variations are not zero. It has been stated that the feed velocity varies between $(v_o - \dot{x}_{min})$ and $(v_o + \dot{X}_{max})$ in grinding and that this phenomenon is similar to type B chatter in lathes. Consequently, the velocity $v_o$ in the equation for Z must be adjusted accordingly. Furthermore, it has been found that the actual depth of cut is not equal to the desired depth of cut when there are deflections of the grinding wheel in the normal direction and $s_o$ must be replaced by $(s_o - y)$. Thus, the actual volume removal rate, which results from wheel motion in the tangential direction, is $$Z_t = (v_o - \dot{x})(s_o - y) \quad (10)$$

As seen in equation (9), the normal grinding force is directly proportional to the volume removal rate. Thus, the normal grinding force, $F_n^x$, resulting from motion of the grinding wheel in the tangential, x, direction is given by $$F_n^x = C_t(v_o - \dot{x})(s_o - y) \quad (11)$$

In addition, if the wheel is moving in the negative y direction, material is removed in the normal direction as in plunge grinding. The volume removal rate, which results from the motion of the grinding wheel in the normal direction only, is approximately proportional to $\dot{y}$ and the actual depth of cut, $(s_o - y)$, and is given by $$Z_n = -\dot{y}\lambda(s_o - y) \quad (12)$$

where $\lambda$ is a constant derived from the process geometry, and the normal grinding force, $F_n^y$, resulting from motion in this direction is given by $$F_n^y = -C_n \dot{y}(s_o - y) \quad (13)$$

where $C_n = \lambda C$

It was found in the simulations that, when the vibratory behavior during grinding is erratic and the grinding wheel is bouncing on the workpiece surface, the volume removal rate in the normal direction produces large forces and $Z_n$ can not be neglected. However, during relatively stable grinding conditions, the velocity of the grinding wheel in the normal direction, $\dot{y}$, is much smaller than its velocity in the tangential direction, $(v_o - \dot{x})$. Thus, under these conditions the grinding force resulting from motion of the wheel in the tangential, x, direction dominates. Consequently, to account for both stable and erratic grinding conditions, the normal and the tangential volume removal terms are both required.

The total grinding force in the normal direction can be approximated by adding equations (11) and (13). The resulting equation is $$F_n = C_t(v_o - \dot{x})(s_o - y) - C_n(s_o - y)\dot{y} \quad (14)$$

where $C_t = C$ from equation (9) and $C_n = \lambda C$.

In adding these two effects, we have neglected terms of the form $\dot{x}\dot{y}$ and any higher order terms which result from an exact solution for the volume removal rate. However, when the actual depth of cut is much smaller than the radius of the grinding tool, which is generally the case, these terms can be neglected. As will be shown hereinafter, this approximation for the normal grinding force, along with the relation between the normal and tangential grinding forces, equation (2), provides good agreement with the behavior observed in experimentation when introduced into the grinding process model, FIG. 1.

Before the equations of motion are simulated, certain additional nonlinearities must be introduced. For example, if $y > s_o$ the wheel is no longer in contact with the workpiece and $C_t = C_n = 0$. In addition, if $\dot{y} > 0$ the wheel is moving away from the workpiece, in the normal direction, and although material can still be removed as a result of motion in the tangential direction, no material is removed in the normal direction. Therefore, under these conditions $C_n = 0$ and material is only removed in the tangential, x, direction with an actual depth of cut equal to $(s_o - y)$. This is valid as long as the actual depth of cut is much smaller than the radius of the cylindrical grinding wheel. Similarly, if $\dot{x} > v_o$ no material is removed as a result of wheel motion in the x direction and $C_{tl} = 0$.

Thus, the resulting grinding force representation and, consequently, the equations of motion are highly nonlinear. It will be shown hereinafter that the resulting equations of motion can generate nonlinear behavior similar to that observed in the experiments.

Simulation

The equations developed in the previous section were then simulated and the conclusions of the simulations were verified experimentally. The objective of the simulations and the experiments was to determine the optimal combination of directional stiffness properties and structural stiffness orientation.

Experiments were run with a 6-inch diameter, 1 inch thick, hard cylindrical grinding wheel, a 2.5 hp grinding tool and a 2-inch long preground mild steel workpiece. Experiments were run for a wide range of wheel speed, desired depth of cut and feed rate. In the specific experiments these parameters were 1200 rmp, $20 \times 10^{-3}$ inch and 0.33 inch/sec respectively.

A typical industrial robot has endpoint compliance properties which vary with arm configuration and direction. To emulate this condition in the grinding experiments, a compliant wrist was designed to permit the variation of the tool suspension stiffness properties. The wrist was also equipped with strain gages for force measurement, and the experimental data was sampled at 500 Hz by a Digital PDP/11 computer.

First, the validity of the model was verified by comparing the simulated output with the behavior observed in experiments. The simulated wave form was generated by varying the parameters involved in equation (14) to find the best match with the experimental data. This parameter matching was repeated for several sets of data corresponding to different values of the design parameters, $k_p$, $k_q$ and $\alpha$ and the process parameters $v_o$ and $s_o$ until satisfactory agreement was obtained for an number of different grinding conditions and directional stiffness properties.

Figure 3A:
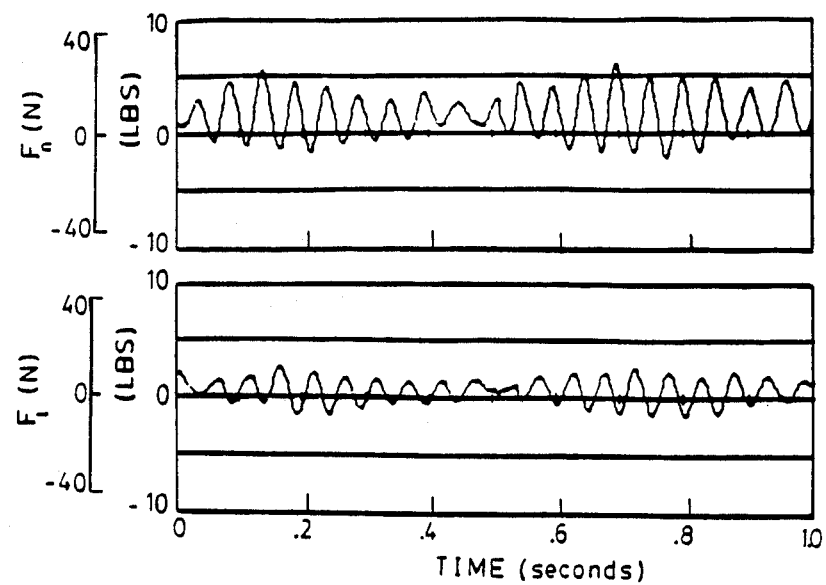
FIGS. 3a and 3b are graphs showing (a) experimental and (b) simulated grinding data for $\alpha = -45°$ and $K_q = 10k_p$.
Figure 3B:
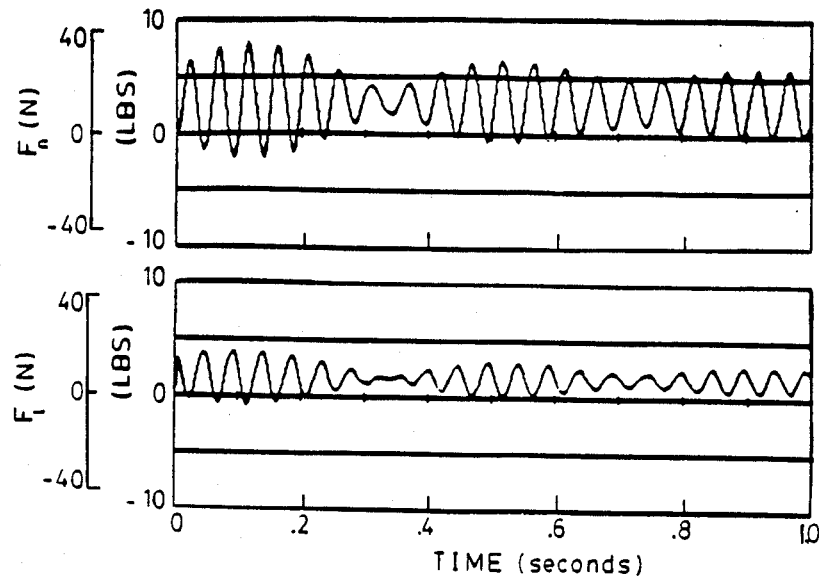

The experimental data and the simulation for a typical set of grinding conditions are shown in FIG. 3. FIG. 3-(a) shows the results of an experiment in which $\alpha = -45°$ and $k_q = 10 k_p$. The higher frequency vibration in the experimental data was about 20 Hz, which was the same as that of the wheel rotation speed. Thus, this vibration is a forced vibration resulting from wheel imbalance. In the simulation, a forcing term which represents the wheel imbalance was introduced. The results of the simulation are shown in FIG. 3-(b) for the same directional stiffness properties and structural stiffness orientation as in the experiment. In each case, a similar wave form was observed at roughly the same frequency and amplitude. Thus, with the identified model parameter values, the simulated response is in satisfactory agreement with the experimental behavior.

The objective of the simulations was to investigate the relationship between the wheel vibrations and the tool suspension design parameters, particularly the static coupling parameter, $\kappa$. The real wheel vibrations observed in the experiments were highly complex and were influenced by such disturbances as wheel imbalance, irregular wheel wear and burrs. These disturbances and parameter changes are difficult to model precisely. However, in order to effectively evaluate the tool suspension design, the response to deflections caused by such disturbances had to be evaluated. Thus, simulations were run to examine the performance of various tool suspension designs in the face of unanticipated wheel deflections which might result from such disturbances.

Figure 4A:
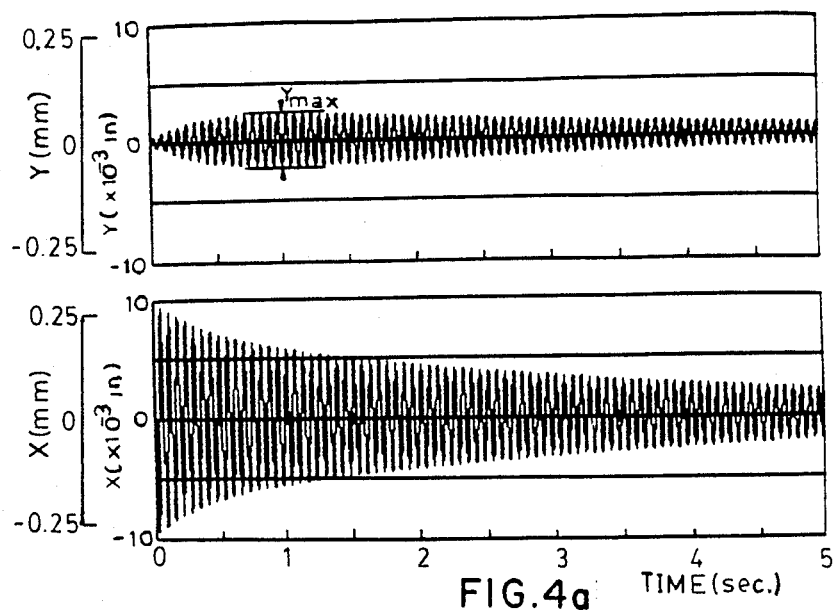
FIGS. 4a and 4b are graphs of definition of (a) $Y_{max}$ for $Y_0 = 0$, $x_0 > 0$ and (b) $t_s$ for $0 < Y_0 < s_0$, $x_0 = 0$.
Figure 4B:
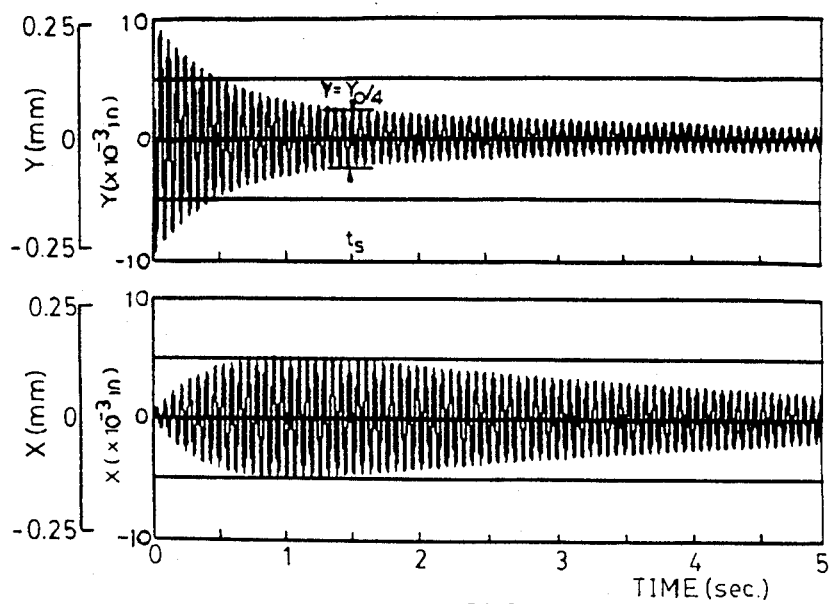

Typical response to disturbances that deflect the wheel in the x and y directions are shown in FIG. 4. These disturbances were considered by changing the initial conditions in the simulations. The initial deflections are $x_o$ in the x direction and $y_o$ in the y direction. The vibratory behavior was evaluated in terms of two representative parameters which were defined for the simulated waveforms: the maximum peak amplitude, $Y_{max}$, and the settling time, $t_s$. As mentioned earlier, the final workpiece dimensions were directly determined by the dynamic behavior of the wheel in the y direction. The maximum peak amplitude, $Y_{max}$, was used as a measure of the wheel vibration in the y direction in response to deflections in the x direction as shown in FIG. 4-(a). For deflections in the y direction, the behavior is shown in FIG. 4-(b) for the same conditions. In this case, the time $t_s$, required for the vibration amplitude to reach $y_o/4$ is used to characterize the vibration.

Figure 5A:
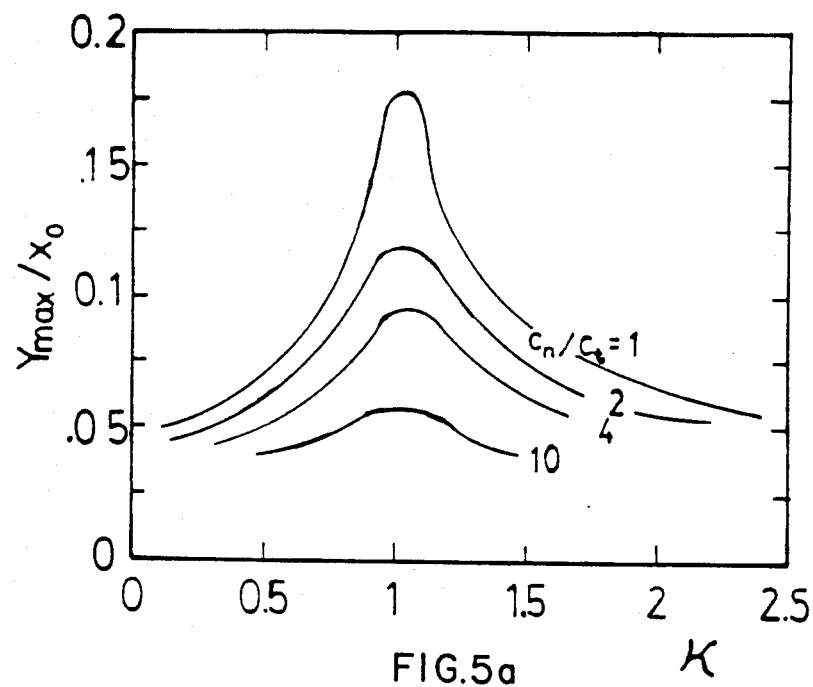
FIGS. 5a and 5b are graphs of the simulated effect of the static coupling parameter, $\kappa$, and grinding force parameter ratio $C_n/C_t$ on $Y_{max}/x_0$ and $t_s$ for $\theta = 45°$, $\alpha = 0$ and (a) $y_0 = 0$, $x_0 > 0$ and (b) $0 < y_0 < s_0$, $x_0 = 0$.
Figure 5B:
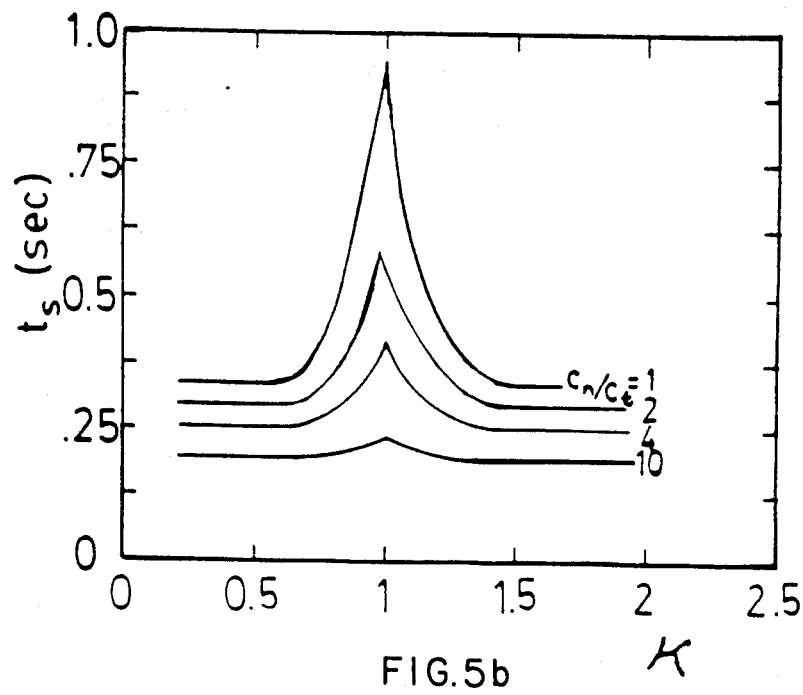

The effects of the static coupling parameter, $\kappa$, on the grinding performance with $\alpha$ set to zero and $\theta = 45°$ is summarized in FIG. 5. Both the maximum peak amplitude, $Y_{max}$, and the settling time, $t_s$, are maximum when $\kappa$ is approximately 1. Therefore, the worst behavior was observed when $\kappa$ is equal to 1, which occurs when $K_n = K_t$. The best disturbance rejection was obtained when $\kappa << 1$ or $\kappa >> 1$, which occurred when the stiffness in the X and Y directions are far apart.

As seen in FIG. 5, grinding performance is directly effected by the static coupling parameter, $\kappa$, which is proportional to the stiffness ratio, $K_t/K_n$. The vibratory behavior is also effected by the grinding force parameters, $C_t$ and $C_n$. FIG. 5 shows the vibratory characteristics associated with grinding force parameter ratios, $C_n/C_t = 1$, 2, 4 and 10. The simulations in which $\kappa = 1$ consistently correspond to the worst grinding conditions for each grinding force parameter ratio. However, as the ratio $C_n/C_t$ increases, the poor behavior observed near $\kappa = 1$ is alleviated, as shown in FIG. 5. As $C_n/C_t$ increases the effective impedance of the process in the normal direction becomes larger than that in the tangential direction. As a result, vibrations are more likely in the tangential direction because the process impedance in that direction is much smaller. Thus, for $C_n/C_t$ large, the importance of avoiding $\kappa = 1$ is less significant. However, this is not the case in typical robot surface grinding applications, thus $\kappa = 1$ should be avoided.

The grinding force parameters were identified by the following procedure. First, the normal grinding force resulting in the simulations under stable grinding conditions when, $\dot{y} << (v_o - \dot{x})$, was matched with that observed under the same conditions in the experiments by varying $C_t$. Once $C_t$ was determined, the normal grinding force parameter, $C_n$ was found by matching the behavior of the simulations with those in the experiments for a number of grinding conditions for which terms involving the velocity of the wheel in the normal direction, $\dot{y}$, could not be neglected. It was found that $C_n/C_t = 2$ provides the best match with experimental data, and for this grinding force parameter ratio the static coupling parameter, $\kappa$, is very important in evaluating grinding performance, as seen in FIG. 5.

From FIG. 5, it is clear that the condition when $k_q = k_p$ must be avoided and $k_p << k_q$ is desirable. However, the optimal structural stiffness orientation, $\alpha$, still had to be determined. Without loss of generality, the optimal orientation angle can be found for $k_p << k_q$.

Figure 6:
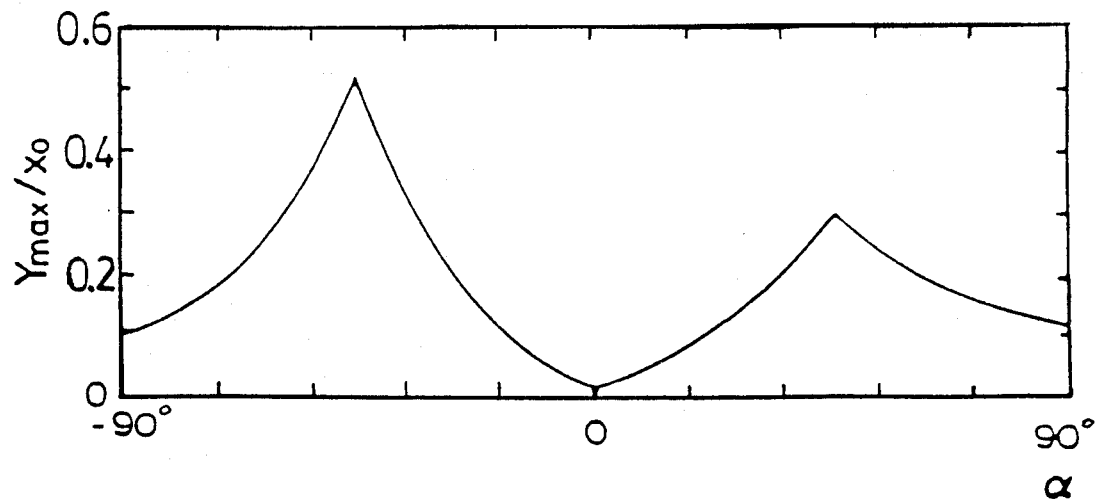
FIG. 6 is a graph of the simulated effect of $\alpha$ on $Y_{max}/x_0$ for $x_0 > 0$ and $y_0 = 0$.

FIG. 6 shows the effect of the structural stiffness orientation, on this normalized performance measure $Y_{max}/x_o$. In this case, the force angle was set to 30° to emulate conditions observed in experiments and to permit comparison. The worst behavior was then observed when $\alpha$ equal 45° or −45°, which correspond to values of $\kappa$ close to 1. The best behavior occurred when $\alpha$ equals zero.

From FIG. 5 it appears that either high or low values of $\kappa$ will provide good performance. High values of $\kappa$ occur when $K_n << K_t$ and low values of occur when $K_t << k_n$. Thus, it remained necessary to determine which of these cases will provide the best grinding performance. Many investigators have introduced springs in the normal direction to improve stability. However, with high compliance in the normal direction it is difficult to accurately locate the grinding wheel in the face of unpredictable dynamic loads. In addition, from the complete equations of motion it was found that the steady state deflection in the y direction, $Y_{ss}$, is directly related to the stiffness in the normal direction by $$Y_{ss} = \frac{C_t v_o s_o}{K_n + C_t v_o}$$

Since $Y_{ss}$ decreases as $K_n$ increases, it is desirable to have $K_n$ as large as possible. This explains the difference between the grinding performance when $\alpha$ equals 0° and 90°, shown in FIG. 6. Although $\kappa$ is much different from 1 in both cases, the normal stiffness when $\alpha$ is 90° is low and consequently the steady state error is large, and large deflections occur in the y direction with this tool suspension design. Thus, the low value of the static coupling parameter, $\kappa$, which corresponds to $\alpha = 0$ and $k_p << k_q$, provides the best overall grinding performance.

Experimentation

Figure 7:
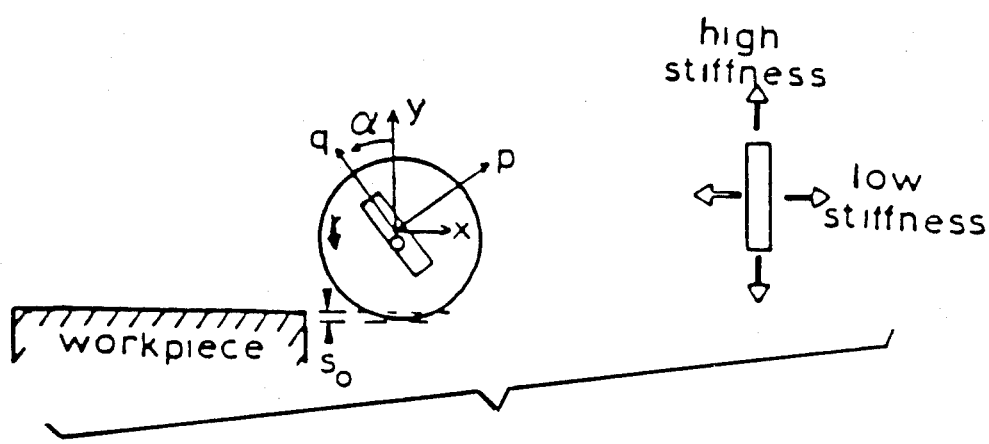
FIG. 7 is a schematic diagram of the wheel and workpiece orientation for the experiments recorded in FIGS. 8 and 11.
Figure 8A:
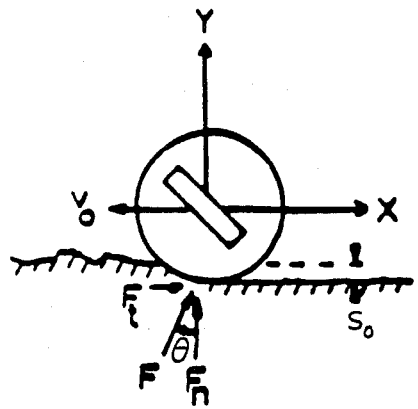
FIG. 8a is a schematic diagram of experimental grinding data for $k_q = 10k_p$ and $\alpha = -45°$ and FIG. 8b is a graph of this function.
Figure 8B:
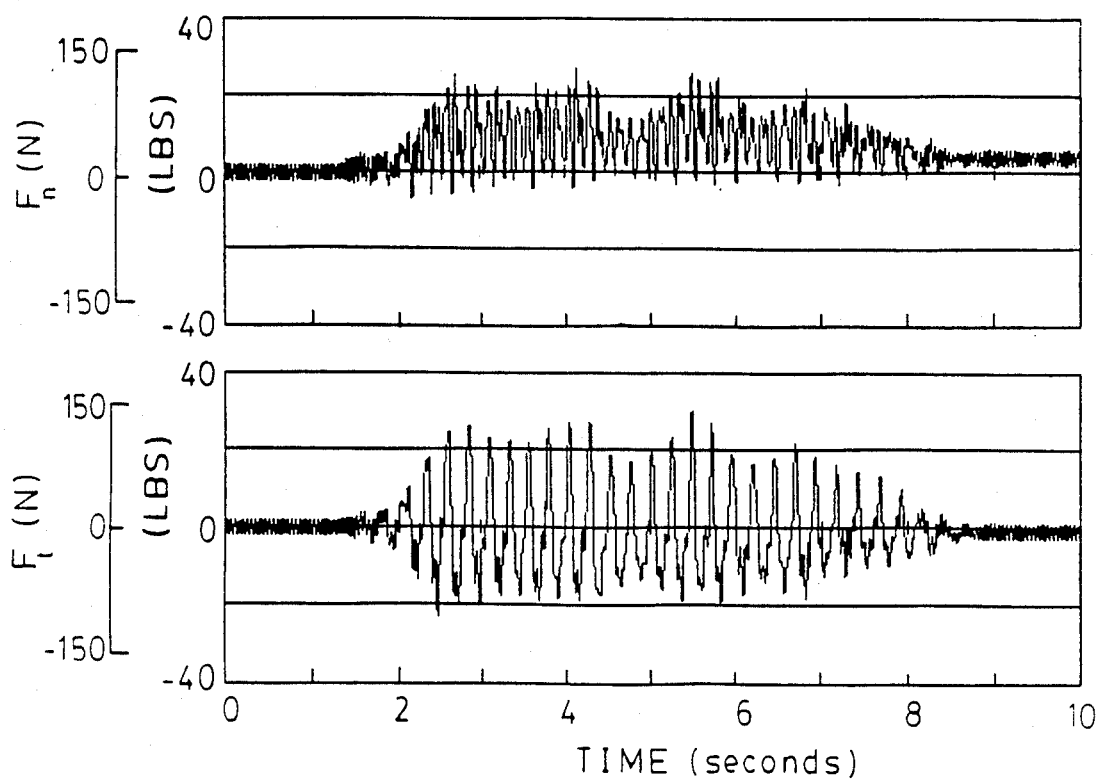
Figure 9A:
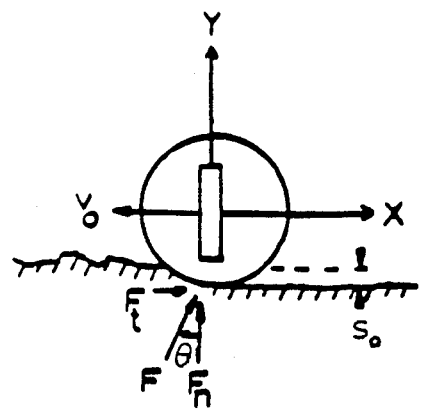
FIG. 9a is a schematic diagram of experimental grinding data for $k_q = 10k_p$ and $\alpha = 0$.
Figure 9B:
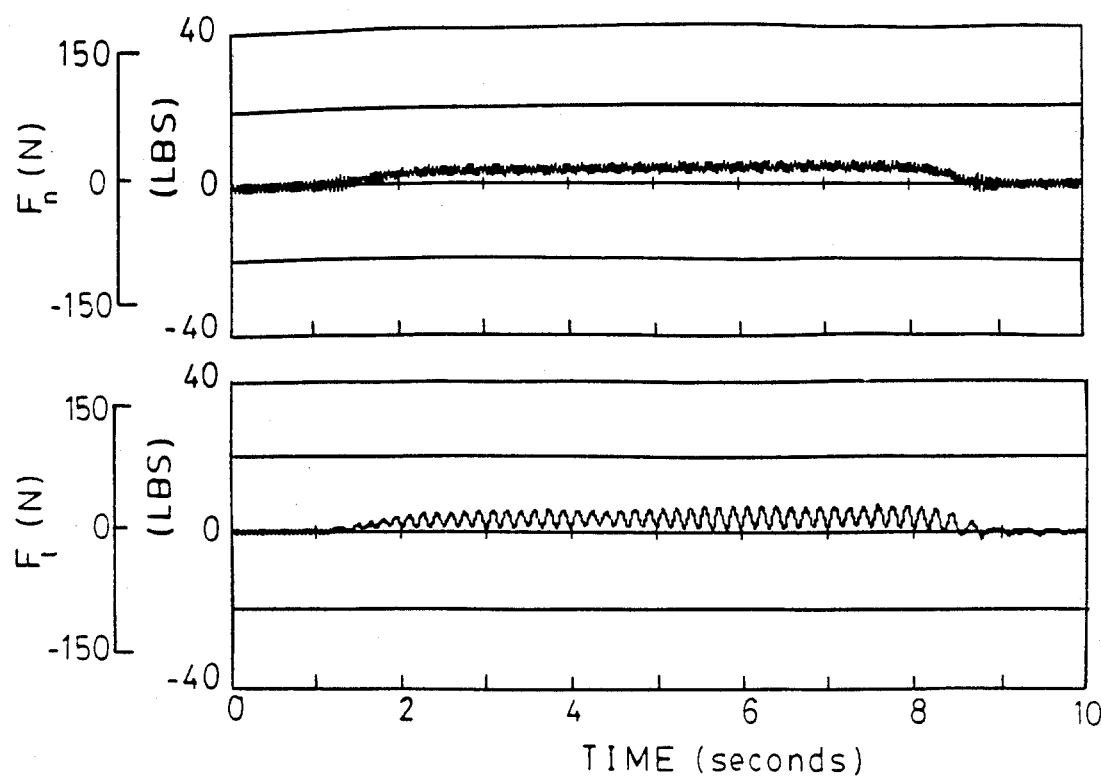
Figure 10A:
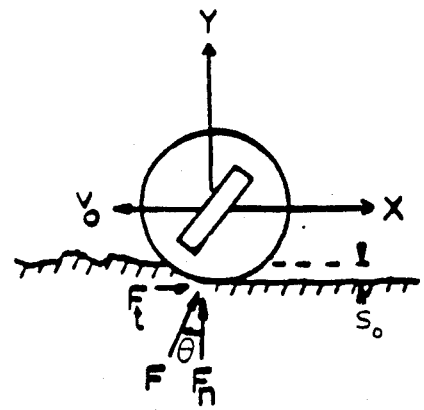
FIG. 10a is a schematic diagram of experimental grinding data for $k_q = 10k_p$ and $\alpha = 45°$
Figure 10B:
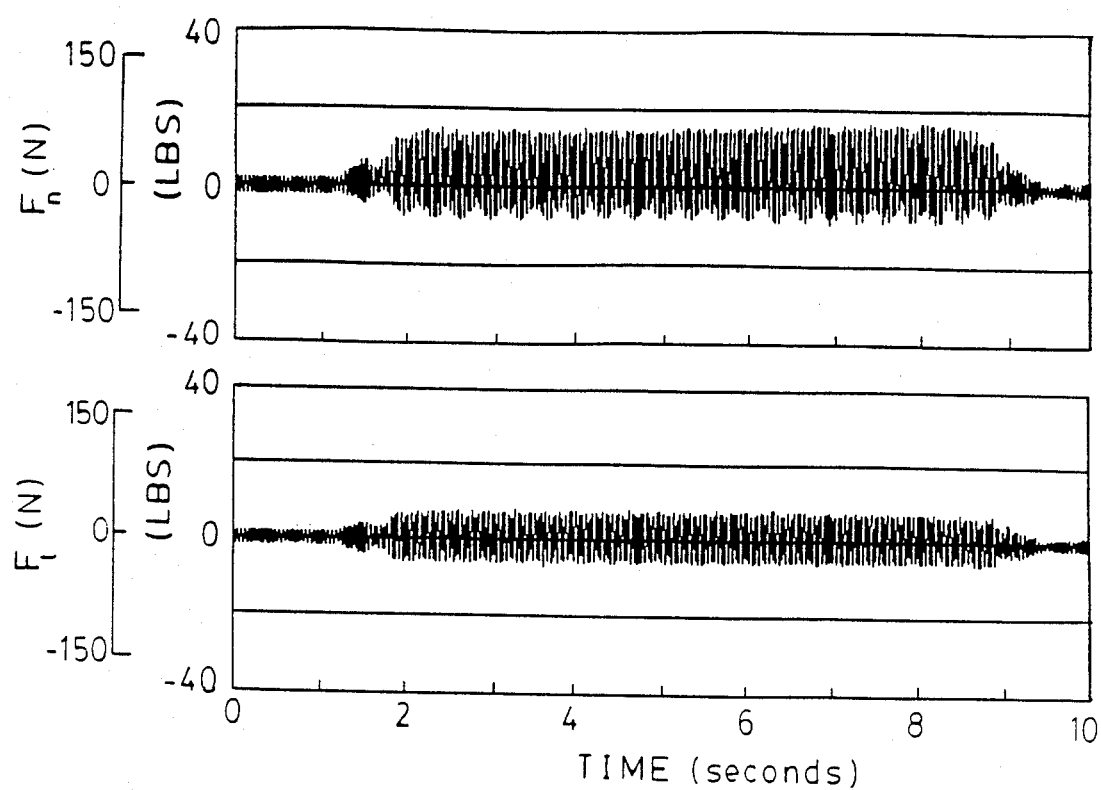
FIG. 10b is a graph of this function.
Figure 11A:
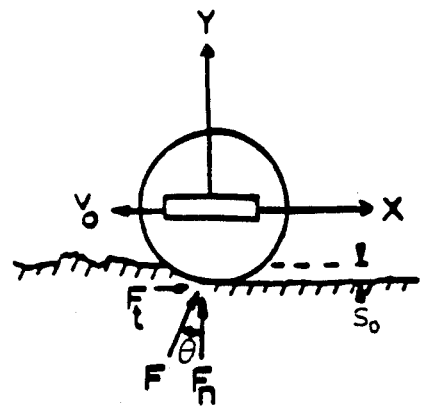
FIG. 11a is a schematic diagram of experimental grinding data for $k_q = 10k_p$ and $\alpha = 90°$ and FIG. 11b is a graph of this function.
Figure 11B:
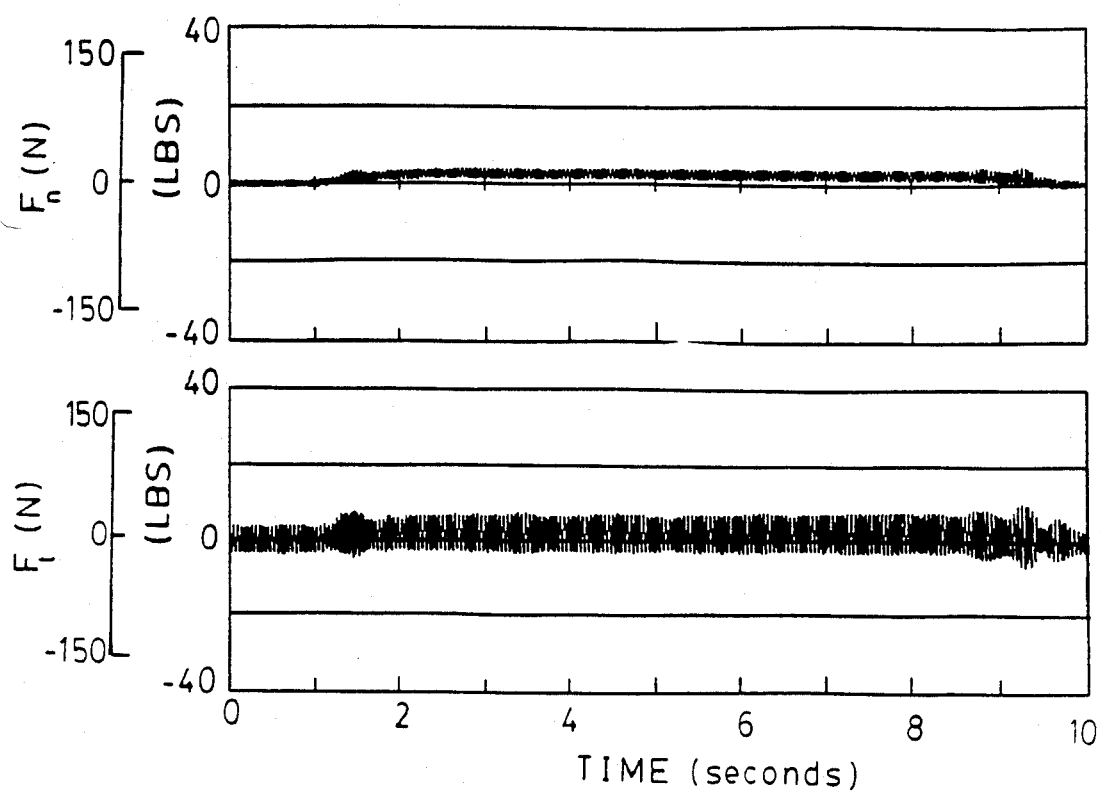

To verify the conclusions of the simulations, the optimal structural stiffness orientation was also determined experimentally. A schematic of the wheel and workpiece orientation for the experiments is shown in FIG. 7. The grinding wheel was suspended by a rectangular beam, for which the directions of the principal axes were adjustable, and $K_p << K_p$. The actual force data for these experiments is shown in FIGS. 8 through 11 for $\alpha = -45°$, 0, 45° and 90°. From the force data in FIGS. 8 and 10, it was clear that orientation angles of 45° and −45° produced highly erratic behavior during grinding. When $\alpha = -45°$, the high stiffness direction was nearly aligned with the resultant grinding force and the behavior appeared to be a high frequency limit cycle with low frequency beats. This phenomenon is common in grinding practice and it was found that the number of beats observed in the force data showed up directly on the workpiece surface as an equivalent number of undesirable low frequency waves. When $\alpha = 45°$, the low stiffness direction is nearly aligned with the resultant grinding force and the deflections are large and erratic; this appears to be the worst tool suspension design. In FIGS. 9 and 11 it appears that orientation angles of 0° and 90° both resulted in relatively stable grinding. For each of these tool suspension designs, it was found that an excellent surface finish could be obtained. To determine which of these designs provides the best overall grinding performance, it was necessary to consider the magnitude of the deflections as well as the degree of stability in the grinding forces.

Figure 12:
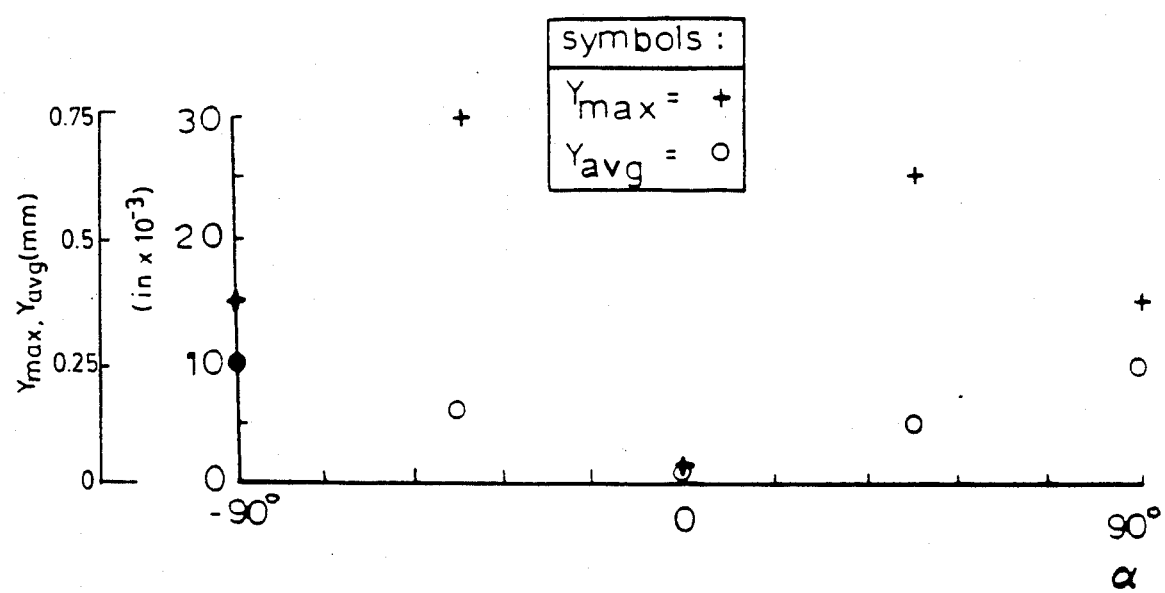
FIG. 12 is a plot of the experimental effect of $\alpha$ on $Y_{max}$ and $Y_{avg}$.

The maximum deflections for each of the experiments are shown in FIG. 12 in the same form as the simulated data in FIG. 6 to permit comparison, except in the experiments the disturbances were unknown and the maximum deflection $Y_{max}$ was not normalized. In addition to the maximum deflection in the y direction, the average deflection is also plotted in FIG. 12 to provide a measure of the actual depth of cut.

As found in the simulations, when $\alpha = 90°$ and $k_p << k_q$ the stiffness in the normal direction is low and consequently, the average deflection, $Y_{avg}$, caused by the grinding force is relatively large. This results in very low material removal rates and very poor accuracy, since $Y_{avg}$ represents the average difference between the actual and desired depth of cut. Thus, although both $\alpha = 0°$ and 90° provide stable grinding, $\alpha = 0$ provides the best overall grinding performance.

Figure 13A:
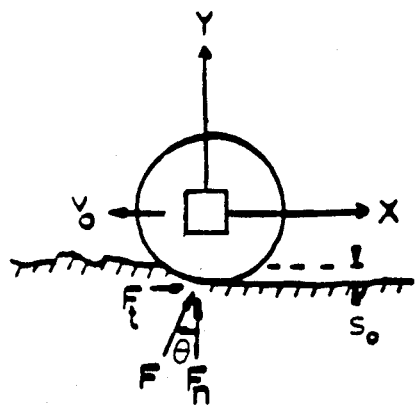
FIG. 13a is a schematic diagram of experimental grinding data for $k_q = k_p$ and $\alpha = 0$ and FIG. 13b is a graph of this function.
Figure 13B:
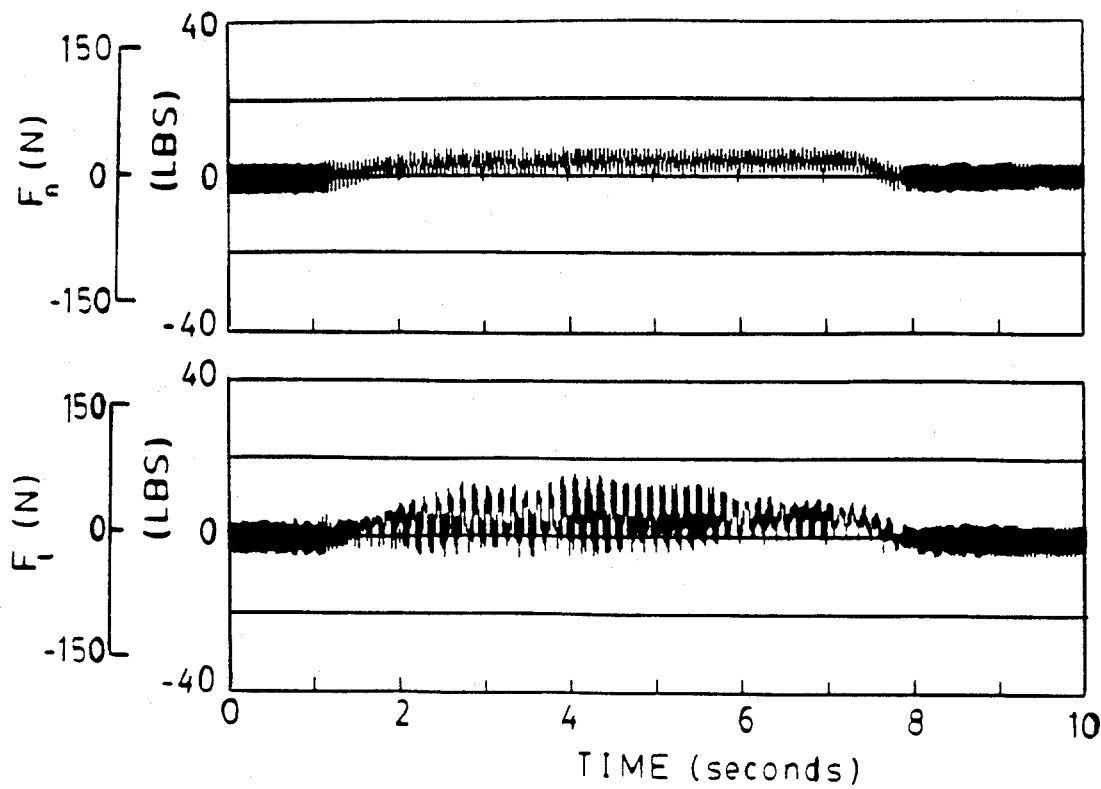

Experiments were also run for $\alpha = 0$ and $k_p = k_q$. To emulate grinding with a robot manipulator, the stiffness of the wheel suspension beam in the two principal directions was chosen to be equal to the endpoint stiffness of a typical industrial robot arm. This is necessary because the maximum suspension stiffness with which the grinding tool is held is limited by the stiffness of the robot arm. With typical robot grinding conditions and $K_n = K_t$, which corresponds to $\kappa = 1$, the behavior shown in FIG. 13 was recorded. The behavior under these conditions was much more erratic than that observed for $\alpha = 0$ or 90 and $k_p << k_q$. This again confirmed the conclusion that $\kappa = 1$ is not a good design for the grinding robot tool suspension system.

The best overall behavior is observed in the experiments when $\alpha = 0$ and $k_p << k_q$. Under these conditions $K_n >> K_t$ and the average deflection and the maximum vibration amplitudes are both minimum, as shown in FIG. 12. Thus, for these conditions the accuracy, stability, and material removal rate are optimal.

End-Effector Compliance Design

It has been shown that the optimal tool suspension design occurs when $K_n >> K_t$. A general design procedure was developed which utilizes this conclusion to determine the optimal grinding end-effector design for an industrial robot. The goal is to achieve high stiffness in the direction normal to the desired workpiece surface and relatively low stiffness in the direction tangent to this surface. The tool suspension system is comprised of both the main robot arm and the end-effector, which couples the main arm to the grinding tool.

The endpoint compliance of the main robot arm is determined by the structural stiffness of the arm linkage and the servo stiffness of the individual joint actuators. It is possible to modify the resultant endpoint compliance, $C_r$, by introducing additional mechanical compliance at the tip of the robot arm.

For simplicity, consider the two degree-of-freedom manipulator shown in FIG. 14. The $O_w - xy$ coordinate frame is defined as before so that the y axis is directed normal to the desired workpiece surface and the x axis is tangent to this surface. The resultant compliance matrix defined with respect to this workpiece coordinate frame is then given by $$C_r^{xy} = C^{xy}_{arm} + C_e^{xy} \tag{14-A}$$

where $C^{xy}_{arm}$ is the endpoint compliance matrix of the main robot arm defined with respect to the workpiece coordinate frame, $O_w - xy$, and $C_e^{xy}$ represents the additional compliance introduced at the endpoint and is also defined with respect to the workpiece coordinate frame, $O_w - xy$. These two terms can be added to obtain the resultant compliance matrix, $C_r^{xy}$, since the additional compliance is in series with the robot arm compliance. In other words, if a force is applied to the grinding wheel, the robot arm and the end-effector will each see the same force.

For a typical industrial robot, the robot arm compliance can be determined by direct measurement or by calculation from the structural stiffness of the arm linkage and the servo stiffness of the individual joint actuators. This endpoint compliance will generally vary with both arm configuration and the direction of the applied force. For the two degree-of-freedom manipulator shown in FIG. 14, the following notation will be introduced to represent the components of the robot arm compliance matrix when defined in the $O_w - xy$ coordinate frame.

$$C^{xy}_{arm} = \begin{bmatrix} C^a_{xx} & C^a_{xy} \\ C^a_{xy} & C^a_{yy} \end{bmatrix} \tag{15}$$

The $O_w - uv$ coordinate frame is then defined, as shown in FIG. 14 so that the end-effector compliance matrix defined with respect $O_w - uv$ is given by $$C_e^{uv} = \begin{bmatrix} 1/k_u & 0 \\ 0 & 1/k_v \end{bmatrix} \tag{16}$$

where $k_u$ and $k_v$ represent the stiffness of the end-effector along the corresponding principal directions, and $\phi$ represents the orientation of the $O_w - uv$ coordinate frame with respect to the $O_w - uv$ coordinate frame. To obtain the resultant compliance matrix, it is first necessary to transform $C_e^{uv}$ into $C_e^{xy}$ by $$C_e^{xy} = R^T C_e^{uv} R \tag{17}$$

where R is the 2×2 rotation matrix associated with the angle $\phi$.

As stated earlier, the goal was to achieve the condition, $K_n >> K_t$. This goal can be represented in the workpiece coordinate frame as an optimal compliance matrix, $C^{xy}_{opt}$. This optimal tool suspension compliance matrix is derived from the conclusions of the simulations and experimentation and is given by $$C_{opt}^{xy} = \begin{bmatrix} C_{xx} & 0 \\ 0 & C_{yy} \end{bmatrix} \text{ where } C_{xx} >> C_{yy} \quad (18)$$

where $C_{xx} = 1/K_n$ and $C_{yy} = 1/K_t$.

An optimal set of design parameters $\phi$, $k_u$ and $k_v$ can now be determined by equating the resultant compliance $C_r^{xy}$ with the optimal compliance $C^{xy}_{opt}$, given in equations (15) and (18) respectively. The primary end-effector design parameters are then determined by the following functions of the components of the robot arm compliance matrix and the optimal compliance matrix.

$$\phi = \tan^{-1} \frac{2C_{xy}^a}{(C_{xx} + C_{xx}^a) - (C_{yy} + C_{yy}^a)} \quad (19)$$

$$k_u = 2/[(C_{xx} - C_{xx}^a) + (C_{yy} - C_{yy}^a) + ((C_{xx} - C_{xx}^a) - (C_{yy} + C_{yy}^a))/\cos 2\phi]$$

$$k_v = 2/[(C_{xx} - C_{xx}^a) + (C_{yy} - C_{yy}^a) - ((C_{xx} - C_{xx}^a) - (C_{yy} + C_{yy}^a))/\cos 2\phi]$$

The following design procedure must then be followed. First, the compliance matrix of the main arm is evaluated for a given workpiece location. The minimum compliance obtainable at the tip of the robot arm is limited by the minimum main arm compliance. Thus, the second design step is to chose $C_{yy}$ equal to this minimum value. Then $C_{xx}$ is chosen so that $C_{xx} >> C_{yy}$. Finally, the primary design parameters can be determined directly from equation (19). It is also possible to determine the optimal workpiece location and orientation by a similar procedure.

As a specific example, $C_{yy} \approx 1/K_{min} = C^a_{max}$ where $K_{min}$ is the minimum translational stiffness at the tip of the arm. For the robot employed in the experiments, $K_{min} \approx 1 \times 10^5$ newtons per meter.

Choose $C_{xx} \geq 5 C_{yy}$, $C_{xx} = 1 \times 10^{-4}$ M/N, for example, will eliminate coupling effects is this case.

Substituting $C_{xx}$ and $C_{yy}$ into equation (19) and with the workpiece normal to the maximum robot endpoint stiffness, the values for $\phi$, $k_u$ and $k_v$ are $\phi = 0$ $K_u \geq 1 \times 10^5$ newtons per meter $K_v \leq 1 \times 10^4$ newtons per meter The optimal tool suspension design for grinding with robots was determined through dynamic analysis, simulation and experimentation. First, the grinding wheel suspension system was characterized by the coupling between the normal and tangential motions. Second, a nonlinear mathematical model of the grinding force was formulated and the model parameters were selected through comparison with experimental grinding force data. Utilizing this model, it was shown that the worst vibratory behavior results when the normal and tangential motion of the grinding wheel are strongly coupled. It was found that the best grinding performance was achieved when the stiffness of the tool suspension system in the direction normal to the desired workpiece surface is much larger than the stiffness in the direction tangent to this surface. This conclusion was verified through both simulation and experimentation. Finally, a design procedure for determining the optimal end-effector design for an industrial robot was developed.

The proposed design procedure has been utilized to design an end-effector for a heavy duty grinding robot. The end-effector is comprised of and optimal tool suspension system and a 6-inch diameter cylindrical grinding wheel with a 2.5 hp motor. The design was tested on the grinding of weld seams and it was found that over 30 mils could be removed from the weld seam in one pass without noticeable chatter and with a good surface finish.

We claim:

1. In a grinding operation employing a manipulator and a rotary grinding tool for removing stock from a workpiece surface, where the operation requires motion between the tool and a workpiece which can only be attained with a manipulator of limited stiffness, and where the relative motion between the tool and workpiece is along a direction which is normal to the axis of rotation of the tool and tangential to the desired finished surface of the workpiece.

the method of adding compliance in the tangential direction while maintaining higher stiffness in the normal direction than in the tangential direction.

2. In a grinding operation employing a manipulator and a rotary grinding tool for removing stock from a workpiece surface, where the operation requires motion between the tool and a workpiece which can only be attained with a manipulator of limited stiffness, and where the relative motion between the tool and workpiece is along a direction which is normal to the axis of rotation of the tool and tangential to the desired finished surface of the workpiece, the method of adding at least five times more compliance in the tangential direction than exists in the normal direction and maintaining larger stiffness in the normal direction than in the tangential direction.

3. In a grinding operation employing a manipulator and a rotary grinding tool for removing stock from a workpiece surface, where the operation requires motion between the tool and a workpiece which can only be attained with a manipulator of limited stiffness, and where the relative motion between the tool and workpiece is along a direction which is normal to the axis of rotation of the tool and tangential to the desired finished surface of the workpiece, the method of orienting the direction of highest manipulator compliance close to tangential to the desired finished surface of the workpiece and maintaining high stiffness in the direction perpendicular to the said surface.

4. The method of claim 1 including adding compliance in the direction perpendicular to the direction of highest manipulator stiffness while orienting the said highest manipulator stiffness direction close to normal to the workpiece surface where the permissible degree of deviation from normal is proportional to the ratio of the total compliance in the direction of the added compliance to the compliance in the direction of the said highest stiffness.

5. The method of claim 2 including adding compliance in the direction perpendicular to the direction of highest manipulator stiffness while orienting the said highest manipulator stiffness direction close to normal to the workpiece surface where the permissible degree of deviation from normal is proportional to the ratio of the total compliance in the direction of the added compliance to the compliance in the direction of the said highest stiffness.

6. The method of claim 3 including adding compliance in the direction perpendicular to the direction of highest manipulator stiffness while orienting the said highest manipulator stiffness direction close to normal to the workpiece surface where the permissible degree of deviation from normal is proportional to the ratio of the total compliance in the direction of the added compliance to the compliance in the direction of the said highest stiffness.

* * * * *